United States Patent
Husted Andersen

(10) Patent No.: US 10,861,021 B2
(45) Date of Patent: Dec. 8, 2020

(54) STATE VALUE INDEXING INTO AN ACTION DATABASE

(71) Applicant: ENT. SERVICES DEVELOPMENT CORPORATION LP, Houston, TX (US)

(72) Inventor: Frederik Husted Andersen, Alleroed (DK)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 40 days.

(21) Appl. No.: 15/510,860

(22) PCT Filed: Nov. 26, 2014

(86) PCT No.: PCT/US2014/067600
§ 371 (c)(1),
(2) Date: Mar. 13, 2017

(87) PCT Pub. No.: WO2016/085489
PCT Pub. Date: Jun. 2, 2016

(65) Prior Publication Data
US 2017/0286971 A1    Oct. 5, 2017

(51) Int. Cl.
*G06F 16/00*    (2019.01)
*G06Q 30/00*    (2012.01)
(Continued)

(52) U.S. Cl.
CPC ....... *G06Q 30/016* (2013.01); *G06F 16/2228* (2019.01); *G06F 16/2379* (2019.01);
(Continued)

(58) Field of Classification Search
CPC . G06F 16/2228; G06F 16/2379; G06Q 10/10; G06Q 10/20; G06Q 30/01; G06Q 30/016; H04M 3/5183
See application file for complete search history.

(56) References Cited

U.S. PATENT DOCUMENTS 6,658,598 B1    12/2003 Sullivan
8,370,155 B2    2/2013 Byrd et al.
(Continued)

FOREIGN PATENT DOCUMENTS

| EP | 2068542 A1 | 6/2009 |
| JP | 2006027022 | 2/2006 |
| JP | 2009193177 | 8/2009 |

OTHER PUBLICATIONS

International Search Report and Written Opinion dated Jul. 28, 2015, PCT Patent Application No. PCT/US2014/067600, filed Nov. 26, 2014, Korean Intellectual Property Office.
(Continued)

*Primary Examiner* — Dinku W Gebresenbet
(74) *Attorney, Agent, or Firm* — Sheppard Mullin Richter & Hampton LLP

(57) ABSTRACT

An example system includes system circuitry that includes an action database. The action database may include an action entry that stores an action for use by a call agent as part of a diagnostic process and an index value associated with the action. The index value may be indicative of a particular state of the diagnostic process. The system circuitry may obtain a state value indicative of a current state of the diagnostic process. The system circuitry may identify the action entry by matching the state value to the index value of the action entry. Then, the system circuitry may retrieve the action of the action entry for use in the diagnostic process.

20 Claims, 8 Drawing Sheets

(51) Int. Cl.
*G06F 16/22* (2019.01)
*G06F 16/23* (2019.01)
*G06Q 10/10* (2012.01)
G06Q 10/00 (2012.01)
H04M 3/51 (2006.01)

(52) U.S. Cl.
CPC ............ *G06Q 10/10* (2013.01); *G06Q 30/01*
(2013.01); *G06Q 10/20* (2013.01); *H04M*
*3/5183* (2013.01)

(56) References Cited

U.S. PATENT DOCUMENTS

| | | |
|---|---|---|
| 8,526,597 B2 | 9/2013 | Geva et al. |
| 9,552,600 B1* | 1/2017 | Goldberg ............... G06Q 30/02 |
| 2005/0015678 A1 | 1/2005 | Miller |
| 2010/0125749 A1 | 5/2010 | Tanaka et al. |
| 2013/0067226 A1* | 3/2013 | Kunde .................. H04L 9/0894 |
| | | 713/168 |
| 2016/0147803 A1* | 5/2016 | Noll .................... H04L 67/1097 |
| | | 707/741 |

OTHER PUBLICATIONS

Jacada Advisor—real Time Customer Service—Jacada—2014—1 page.
Real-time Guidance & Automation—NICE Systems—2 pages—date unknown.

* cited by examiner

STATE VALUE INDEXING INTO AN ACTION DATABASE

CLAIM FOR PRIORITY

The present application is a national stage filing under 35 U.S.C. § 371 of PCT application number PCT/US2014/067600, having an international filing date of Nov. 26, 2014, the disclosure of which is hereby incorporated by reference in its entirety.

BACKGROUND

New products and services are constantly being released with increased functionality and complexity. Support for these new products and services can be provided through a call center, through which call agents may support callers with issues or questions concerning a particular product or service. As the complexity of products and services increases, call centers may utilize increasingly complex processes to identify and support specific product and service issues.

BRIEF DESCRIPTION OF THE DRAWINGS

Certain examples are described in the following detailed description and in reference to the drawings.

DETAILED DESCRIPTION

The disclosure below may provide increased efficiency and flexibility in guiding an interaction between a call agent and a caller. Implementation of an action database and indexing into the action database according to a current state of a diagnostic process between the call agent and caller may provide a quick, efficient, cost-effective, and flexible mechanism for providing guidance to the diagnostic process. Thus, the call agent may more quickly and efficiently resolve a caller issue. The action database implementation may also support increased ease and flexibility in updating or changing steps in the diagnostic process, thus allowing a product or service provider to more easily and efficiently implement protocol changes and/or new protocols for supported products or services.

Figure 1:
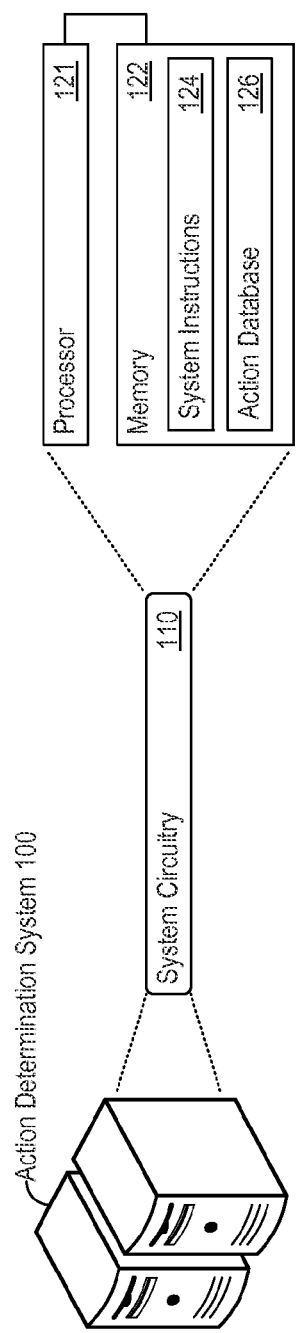
FIG. 1 shows an example of a system for guiding an interaction between a call agent and a caller.

FIG. 1 shows an example of an action determination system 100 for guiding an interaction between a call agent and a caller. The interaction between the call agent and the caller may be referred to as a diagnostic process, and examples of a diagnostic process between a call agent and caller may include diagnosing and resolving a caller issue with a product or service, providing technical information, executing financial transactions, performing market research, soliciting financial contribution, and more. Examples of diagnostic processes may thus include customer service calls, information technology (IT) support calls, product help desk calls, live software support calls, and the like. The action determination system 100 may be part of a call center, and the call center may include any number of agent devices for use in handling customer calls.

The action determination system 100 may include system circuitry 110. The system circuitry 110 may be a part of the implementation of any functionality provided by the action determination system 100. As described in greater detail below, the system circuitry 110 may determine an action specific to a current state of a diagnostic process between a call agent and a caller. The action may be an action relevant to the current state of the diagnostic process, such as an action to advance the diagnostic process to a next state or an action prohibited or excluded from the current state. The system circuitry 110 may configure and maintain an action database 126 that correlates a relevant action to a particular state of the diagnostic process. The system circuitry 110 may index into the action database 126 according to the current state of the diagnostic process to retrieve the relevant action.

In some implementations, the system circuitry 110 includes a processor 121, a memory 122, or both. The processor 121 may be one or more central processing units (CPUs), microprocessors, and/or any hardware device suitable for executing instructions stored on the memory 122. The memory 122 may be any electronic, magnetic, optical, or other physical storage device that stores executable instructions, such as the system instructions 124. Thus, the memory 122 may be, for example, Random Access Memory (RAM), an Electrically-Erasable Programmable Read-Only Memory (EEPROM), a storage drive, an optical disk, and the like. The memory 122 may store the action database 126 as well.

The processor 121 may execute the system instructions 124 to obtain a state value indicative of the current state of the diagnostic process, index into the action database 126 according to the state value, and retrieve one or more relevant actions for the current state of the diagnostic process. By utilizing an action database 126 and indexing into the action database 126 according to a current state of the diagnostic process, the system circuitry 110 may provide an efficient, low-cost, and flexible implementation for guiding the diagnostic process and supporting changes or additions to the diagnostic process.

Figure 2:
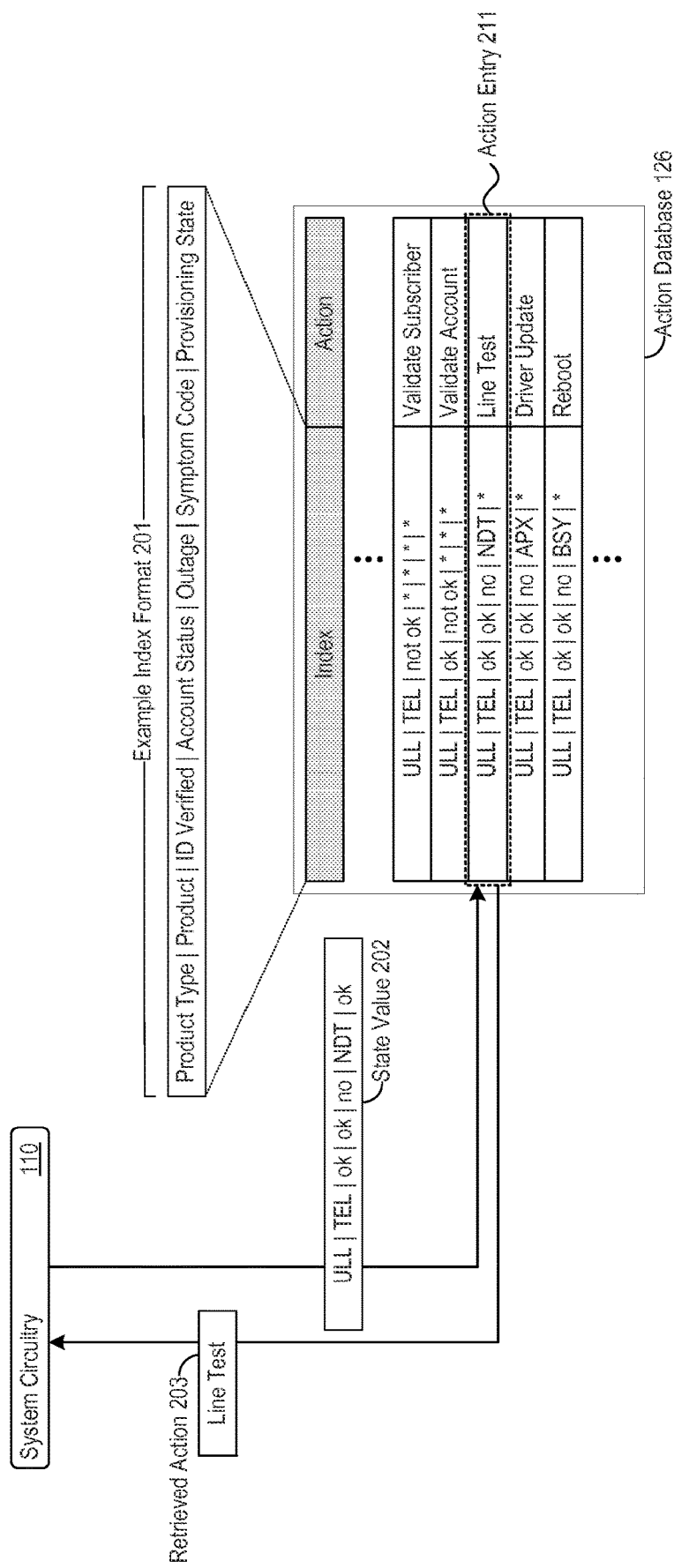
FIG. 2 shows an example of system circuitry retrieving an action from an action database.
Figure 3:
FIG. 3 shows an example of the system circuitry retrieving multiple actions from the action database.
Figure 4:
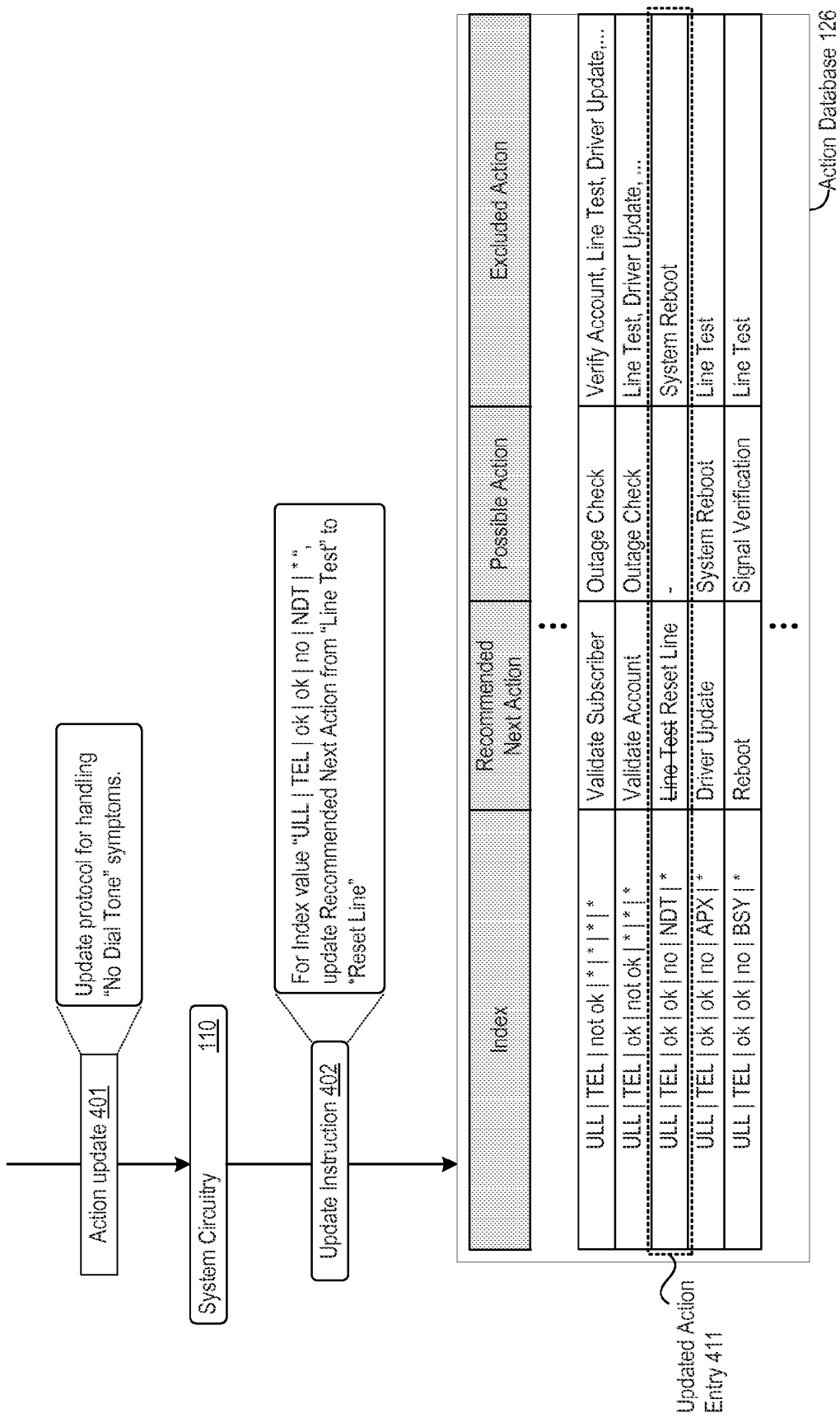
FIG. 4 shows an example of an update to the action database.

FIG. 2 shows an example of the system circuitry 110 retrieving an action from the action database 126. The action database 126 may be part of the system circuitry 110 or separately maintained (e.g., in a different or remote database system). For illustrative purposes, FIGS. 2-4 depict examples of the system circuitry 110 and the action database 126 as separate elements, though it is understood that in some implementations the action database 126 is a part of the system circuitry 110.

The system circuitry 110 or other management logic may configure the action database 126 to support real time, efficient access to support a diagnostic process between a call agent and a caller. In FIG. 2, one specific example is presented with regards to a connectivity diagnostic process between a call agent and a user of a communications service provider. However, the system circuitry 110 and action database 126 may be configured support any type of interaction between a call agent and caller. As described below, the system circuitry 110 may provide a state value 202 indicative of a current state of the diagnostic process and receive a retrieved action 203 for the current state.

The action database 126 may correlate relevant actions for the diagnostic process based on the current state of a diagnostic process between a call agent and a caller. The action database 126 may, for example, associate a set of one or more corresponding actions to a particular state of the diagnostic process. In that regard, the action database 126 may be indexed by values indicative of the current state, e.g., a current state value. An action may be retrieved from the action database 126 according to the index value indicative of the current state of the diagnostic process. FIG. 2 shows an example implementation for the action database 126 where database entries respectively include an index value and an action.

The system circuitry 110 may represent a current state of the diagnostic process as a state value 202. The action database 126 may index entries according to a specific index format, and the system circuitry 110 may obtain or generate the state value 202 according to the index format implemented by the action database 126. The format of an index value may be configurable to reflect selected aspects, portions, variables, or elements of a current state of the diagnostic process. The system circuitry 110, database administrator, or other management entity may configure and maintain the action database 126 accordingly.

The index value format may include selected state values to distinguish different states of the diagnostic process, and the specific selected state values may vary according to a particular diagnostic process conducted by the caller and call agent. The state value 202 may include subvalues indicative of a product, service, status element, process result, or other data to identify different states of the diagnostic process. For instance, subvalues of the index format (and as reflected in a state value 202 represented by the system circuitry 110) may include result indications of one or more tests performed as part of the diagnostic process. Thus, as the diagnostic process advances, the system circuitry 110 may populate the state value 202 with additional or updated state data.

One example index format is shown in FIG. 2 through the example index format 201, which specifies a list of string values to represent a current state of a connectivity diagnostic process. The example index format 201 includes index subvalues for different elements of a diagnostic process for determining connectivity to a communication network, and specifically includes the fields of product type, product, status of whether a user identification (ID) is/has been verified, outage status for the communication network, a symptom code, and a provisioning state value. In FIG. 2, the system circuitry 110 generates the particular state value 202 with respective index subvalues of Unconditioned Local Loop ("ULL"); Telephony ("TEL"); "ok", "ok", "no"; No Dial Tone ("NDT"); and "ok" to represent a particular state of the connectivity diagnostic process.

The action database 126 may support any number of index formats in addition or as an alternative to the example index format 201 in FIG. 2. The action database 126 may, for example, represent index values as state codes. A state code may represent state values for a particular state in the diagnostic process without specifying actual state values. The state code may be produced as a function of the current state values, such as through a hash function, a mapping table, or any other code generating mechanism. The index value may take the form of a numerical identifier translated from a particular state of the diagnostic process, as another example.

To generate the state value 202, the system circuitry 110 may collect data relevant to the diagnostic process to represent the current state. As some examples, the system circuitry 110 may obtain state data through caller inputs prior to interaction with the call agent (e.g., inputted through a dial-tone menu or interactive voice system prior to connecting to the call agent), through a previous action performed in the diagnostic process, through archived customer or caller data, or from various other sources. The system circuitry 110 may generate a state value 202 even if not all subvalues of the state value 202 are known. In some variations, the system circuitry 110 may insert a wildcard or masked value for unknown values of the current state, such as when a particular action or diagnostic test has yet to be performed or when a service, product, or caller status has yet to be determined by the diagnostic process. In other variations, the system circuitry 110 may truncate the state value 202 and provide a shortened value that accounts for a known state value for a particular point (e.g., state) in the diagnostic process but does not account for an unknown state value at the particular point. In this variation, the action database 126 may include index values with one or more wild card values to match the shorted state value provided by the system circuitry 110. Entries in the action database 126 may be sequenced so the system circuitry 110 matches shortened state value properly, for example by considering index values with less number of wildcard values first and index values with a greater number of wildcards later. As another possibility, the action database 126 may include shortened index values to match to shortened state value provided by the system circuitry 110.

Upon obtaining a state value 202, the system circuitry 110 may index into the action database using the state value 202 to identify a corresponding database entry. Entries in the action database 126 may be referred to as action entries, and in FIG. 2 the system circuitry 110 identifies the action entry 211 as correlating to the provided state value 202. The system circuitry 110 may retrieve one or more actions from the correlated action entry to return as the retrieved action 203. Referring again to the specific example presented in FIG. 2, the system circuitry 110 retrieves the "Line Test" action from the correlated action entry 211 as the retrieved action 203 relevant to the current state of the diagnostic process represented through the state value 202.

To index into the action database 126 with the state value 202, the system circuitry 110 may match an inputted state value 202 with a corresponding index value in the action database 126. The system circuitry 110 may match the state value 202 to the index value of the action entry when the state value 202 and the index value are identical. An index in the action database 126 may include a masked value for portion of the index value, e.g., for one or more index subvalues. The masked value of an index may be represented through a wildcard value. In this example, the system circuitry 110 may match a state value 202 to a particular index value for an action entry when the state value 202 and particular index value are (i) not identical; and (ii) when the non-masked portions of the particular index value match identically to the corresponding portions of the state value 202. Such an example is shown in FIG. 2, where the system circuitry 110 matches the specific state value 202 in FIG. 2 with the index value for the action entry 211. The system circuitry 110 may match the state value 202 to the index value for the action entry 211 even though the provisioning state value for the state value 202 and index value are not identical. In this case, the provisioning state value "ok" for the state value 202 corresponds to the masked value * of the index value (which may represent a wildcard value for the provisioning state subvalue), and the other non-masked portions of the index value identically match the corresponding portions of the state value 202.

The action database 126 may include multiple entries with an index value matching a particular state value 202 determined by the system circuitry 110. For example, a first entry in the action database 126 may have an index value identical to the particular state value 202 and a second entry may have an index value that is non-identical but includes one or more masked values that would cause the system circuitry 110 to determine a match for the particular state value 202. The system circuitry 110 may determine one of the multiple matching entries as the corresponding action entry for a particular state in the diagnostic process. For instance, the system circuitry 110 may search the index values of the action database 126 according to a search sequence, and determine the correlating action entry as the first identified entry with an index value that matches the inputted state value 202. In this example implementation, the ordering of the entries in the action database 126 may determine or control which action entry the system circuitry 110 identifies as the correlating action entry. Accordingly, entries of the action database 126 may be organized in a configurable order, e.g., according to increasing or decreasing complexity of index value, according to increasing or decreasing number of masked values in the index value, sorted according to a particular index subvalue (e.g., particular high priority index subvalues ordered earlier in the sequence), or in other ways to control which entry the system circuitry 110 first identifies a matching index value for. The system circuitry 110 or another database management entity may specify, configure, or otherwise sequence the entries in the action database 126 to control which particular entry the system circuitry 110 identifies as the corresponding entry.

Upon identifying a corresponding action entry in the action database 126, the system circuitry 110 may retrieve one or more actions from the corresponding action entry. The system circuitry 110 may provide the retrieved action 203 for use in the diagnostic process between the call agent and caller. In that regard the retrieved action 203 may provide guidance for the specific state of the diagnostic process represented through the state value 202. For example, the retrieved action 203 may specify, for the current state of the diagnostic process, a next action to perform to advance the diagnostic process. Upon advancing the diagnostic process, the system circuitry 110 may identify additional, different, or changed state values, generate an updated state value 202 to represent the updated current state, and index into the action database 126 to determine a next relevant action for the diagnostic process.

FIG. 3 shows an example of the system circuitry 110 retrieving multiple actions from the action database 126. In particular, FIG. 3 shows an example implementation of the action database 126 where an action entry can store multiple actions for a particular index value. Thus, the action database 126 may provide multiple actions relevant to a particular state of the diagnostic process. Some examples of relevant actions and different action types that are relevant to a particular state in the diagnostic process are shown in FIG. 3 and are discussed next.

As an example of a relevant action, entries in the action database 126 shown in FIG. 3 include a "recommended next action" field. The recommended next action field may store one or more actions to perform for a specific state of the diagnostic process to advance the diagnostic process. Continuing with the connectivity diagnostic process example, the recommended next action may specify a particular test or diagnostic tool to utilize for a particular connectivity symptom, such as a line test action for a "No Dial Tone" symptom. The recommended next action may represent the particular action(s) a service or product provider has determined will most efficiently and/or quickly advance the diagnostic process to come to a resolution for the caller's issue, and actions stored in this entry field may be configurable by such a service or product provider.

As another example of a relevant action, entries in the action database 126 shown in FIG. 3 include a "possible action" field. The "possible action" field may specify one or more actions that can be performed for the specific state of the diagnostic process. Actions stored in the possible action element of an action entry may progress the diagnostic process, but may not directly address a particular symptom, status value, or unknown state element for the specific state of the diagnostic process. Put another way, the "possible action" field may specify helpful actions to perform in addition to the action(s) specified by the "recommended next action" field.

As yet another example of a relevant action, entries in the action database shown in FIG. 3 include an "excluded action" field. The "excluded actions" field may specify actions that would impede advancement of the diagnostic progress, and may include actions that would be ineffective, inoperable, or detrimental to the specific state of the diagnostic process. Such excluded actions may compromise the security of the call agent, caller, or call center, reduce communication capability, worsen the symptoms or issues experienced by the caller, or otherwise impede the diagnostic process. These excluded actions may also be configured by a product or service provider to guide the diagnostic process. While three examples of action types have been presented in FIG. 3, the system circuitry 110 and action database 126 may support any number of additional or alternative actions or other action type fields in an action entry to provide guidance for the diagnostic process.

Continuing with the above connectivity diagnostic process example, the system circuitry 110 in FIG. 3 obtains a state value 202 with the value of "ULL|TEL|not ok|*|no|NDT|*". The masked values in the state value 202 represented with an * value may represent unknown values of the current state, and the system circuitry 110 may represent such unknown state values as masked or wildcard characters when indexing into the action database 126 to identify a corresponding action entry for the state value 202. In FIG. 3, the system circuitry 110 identifies the action entry 311 as the particular action entry correlated to the state value 202 by matching the state value 202 to the index value for the action entry 311. The system circuitry 110 may then retrieve any of the multiple actions stored in the action entry. The system circuitry 110 obtains the retrieved actions 203, which in this particular example includes the recommended next action of "Validate Subscriber", the possible action of "Outage Check", and the excluded actions of "Verify Account, Line Test, Driver Update, . . . ".

FIG. 4 shows an example of an update to the action database 126. The action database 126 may flexibly support changes to a diagnostic process by simplifying the update process. In that regard, a change to an entry in the action database 126 will effectuate a corresponding change to how the diagnostic process is handled by the call agent. One such illustration is presented in FIG. 4.

In FIG. 4, the system circuitry 110 receives an action update 401. The action update 401 may specify a requested change to one or more entries of the action database 126. A service provider whose service is supported through the diagnostic process may request changes to how one or more states of the diagnostic process are handled. In the example shown in FIG. 4, a service provider sends an action update 401 requesting a change in the protocol for how "No Dial Tone" symptoms are handled, particularly by updating the recommended next action from a "line test" action to a "reset line" action. The system circuitry 110 may apply the change specified by the action update 401 by updating one or more corresponding entries in the action database 126 specified by the action update 401. In this particular example, the system circuitry 110 identifies and updates the updated action entry labeled as 411 in FIG. 4, by replacing the previous action in the "recommended next action" field with an updated action. To do so, the system circuitry 110 may send an update instruction 402 to the action database 126.

Thus, the system circuitry 110 and action database 126 may support changes to the flow of the diagnostic process through entry updates, which may reduce the computing, bandwidth, power consumption or other costs for updating a diagnostic process. A service or product provider may easily update any preferred, possible, excluded, or other action types for a specific state of the diagnostic process, which may allow the service provider to flexibly and easily support product updates, effectuate changes in diagnostic procedures, adapt to safety requirements, or otherwise support any change to the diagnostic process. The system circuitry 110 may likewise support additions or deletions to the action database 126, such as inserting corresponding action entries when a service provider introduces a new service or service type.

Figure 5:
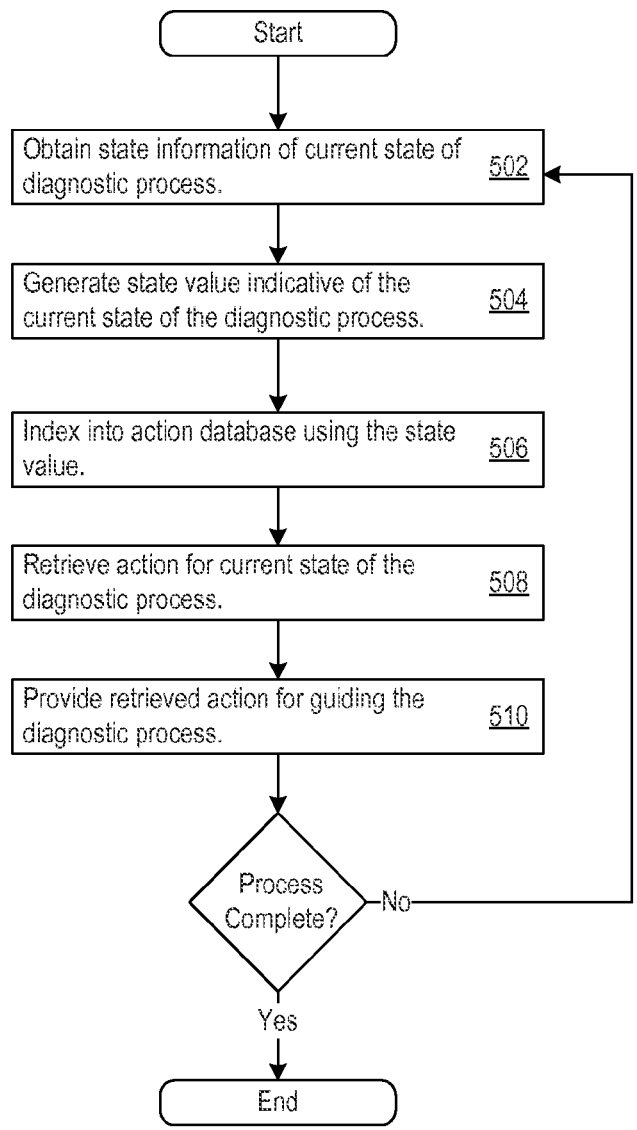
FIG. 5 shows an example of a method that the system circuitry may implement to determine an action for a current state of a diagnostic process.

FIG. 5 shows an example of a method 500 that the system circuitry 110 may implement to determine an action for a current state of a diagnostic process. The system circuitry 110 may implement the method 500 as logic in hardware, software, or a combination of both. In some implementations, the system circuitry 110 implements the method 500 as a non-transitory computer readable medium (e.g., the memory 122) storing computer executable instructions (e.g., the system instructions 124) that a computer executes to perform the method 500.

The system circuitry 110 may obtain state information regarding a current state of a diagnostic process between a call agent and a caller (502). The state information may come from any number of sources, such as caller identification, account, service, or other information input prior to interacting with a call agent, result data from one or more actions previously performed during the diagnostic process, retrieved status information for any elements relevant to the diagnostic process (e.g., account status, status of devices, products, or tools used in the diagnostic process, and more), call agent input from interacting with the caller, and more. The state information may include updated information used to augment a previous state of the diagnostic process into a new updated state for the diagnostic process.

The system circuitry 110 may obtain (e.g., generate) a state value 202 indicative of the current state of the diagnostic process (504), and in a format supported by an action database 126 for example. The system circuitry 110 may generate the state value 202 from the obtained state information, a previous state value obtained by the system circuitry 110, or both. In generating the state value 202, the system circuitry 110 may represent the current state of the diagnostic process as a variable, vector, code, or other value indicative of the current state, and the system circuitry 110 may index into the action database 126 using the state value 202 (506). Accordingly, the system circuitry 110 may identify a corresponding entry in the action database 126 specifying a relevant action for the current state. The system circuitry 110 may employ any of the methods or techniques discussed above to identify the corresponding entry when multiple action entries in the action database 126 have an index value that matches to the state value 202. The system circuitry 110 may then retrieve one or more actions stored in the corresponding entry (508) and provide the retrieved action for guiding the diagnostic process (510). For example, the system circuitry 110 may provide the retrieved action(s) 203 to a call agent device which may present the retrieved action 203 to the call agent for use in the diagnostic process.

The system circuitry 110 receives subsequent state information, such as state changes resulting through performing of the retrieved action. In this scenario, the system circuitry 110 may determine an updated state value reflective of the updated current state of the diagnostic process that accounts for the subsequent state information. The system circuitry 110 may index into the action database 126 with the updated state value to retrieve another action, and may continue this process until a resolution of the diagnostic process is reached. For example, the system circuitry 110 may determine the diagnostic process has reached a resolution when an action entry provides an end-of-process indication, when the caller terminates the call, or upon receiving an ending indication from the call agent or agent device.

Figure 6:
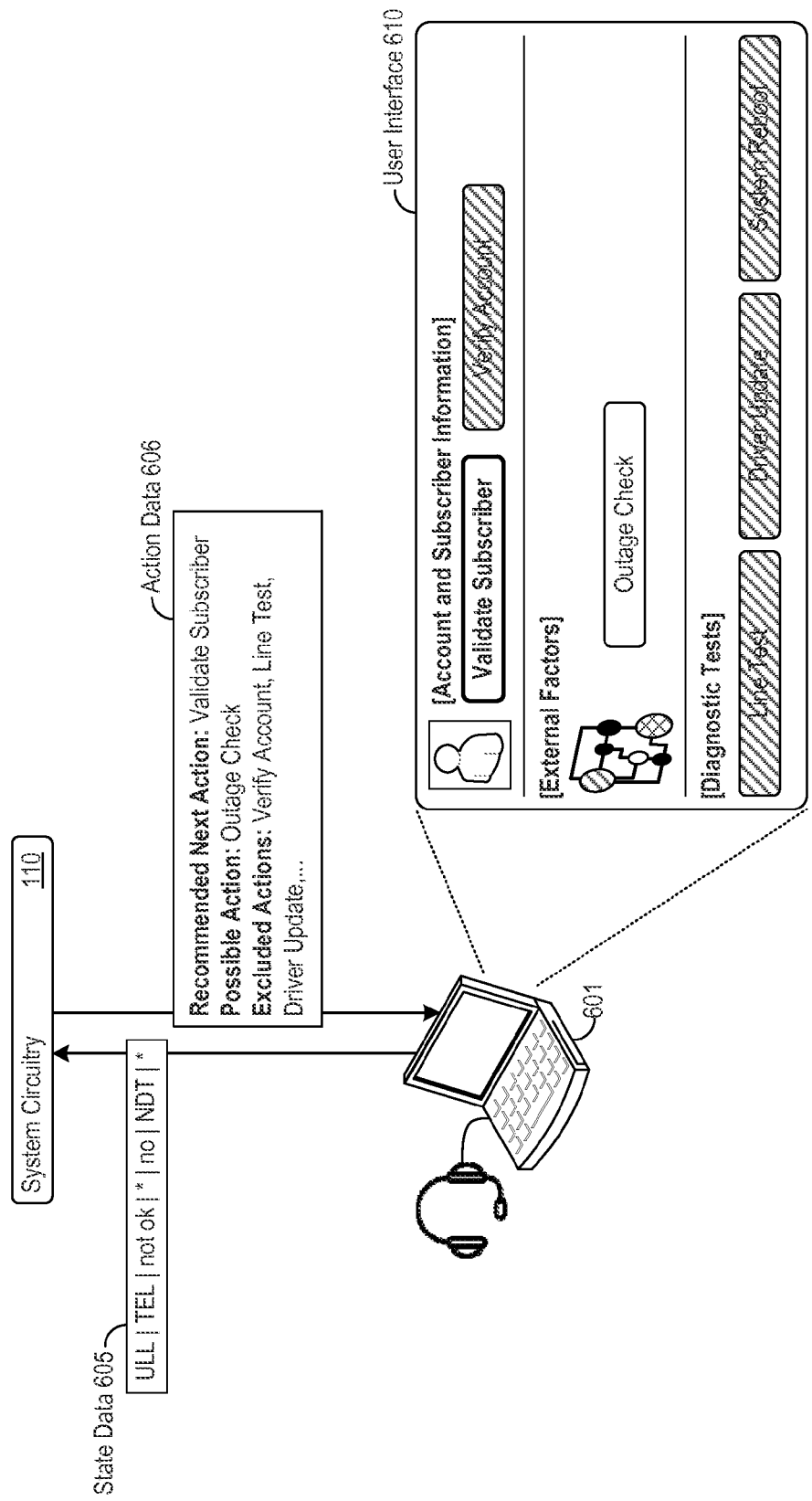
FIG. 6 shows an example of an agent device presenting one or more actions for guiding a diagnostic process

FIG. 6 shows an example of an agent device 601 presenting one or more actions for guiding a diagnostic process. Although illustrated as separate from the system circuitry 110 in FIG. 6, the agent device 601 may implement any portion, functionality, or element of the system circuitry 110, including the action database 126. The agent device 601 may include circuitry and/or logic for providing state data 605, receiving action data 606, and presenting the action data 606 through a user interface 610.

To further illustrate, the agent device 601 may obtain state data 605 for a diagnostic process between a call agent (e.g., the call agent using the agent device 601) and a caller. The agent device 601 may receive state data 601 as inputs from the call agent, e.g., with information provided by the caller, upon performing an action for the diagnostic process, through information access from internal and/or external data sources, or in any other way. The agent device 601 may provide the state data 605 to the system circuitry 110. In some variations, the agent device 601 may provide a generated state value 202 as the state data 605, and the agent device 601 may maintain, augment, and or otherwise update the state value 202 to be indicative of the current state of the diagnostic process. In other variations, the agent device 601 may provide state data 605 as a change, difference, or update to the state of the diagnostic process, e.g., without repeatedly sending unchanged state data previously provided to the system circuitry 110. The agent device may provide the state data 605 for use in indexing into an action database 126 to determine relevant action(s) for the current state of the diagnostic process.

The agent device 601 may receive action data 606 from the system circuitry 110, which the system circuitry 110 may have retrieved through indexing into the action database 126 according to the current state of the diagnostic process. The action data 606 may include actions of multiple action types, and in FIG. 6 the action data 606 includes the actions types "recommended next action", "possible actions", and "excluded actions".

The agent device 601 may visualize the action data 606 for guiding the diagnostic process. The agent device 601 may present none, some, or all of the action data 606 in the user interface 610, and provide a visual indication differentiating the different action types specified in the action data 606. The agent device 601 may utilize any combination of visual indicators based on color, size, location, or other visual aspects to differentiate between action types presented by the agent device 601. As one specific example shown in FIG. 6, the agent device 601 may visually accent the "recommended next action" by applying a bolded emphasis. The agent device 601 may present a visual indication that of one or more actions that should not be performed at the current state of the diagnostic process. In FIG. 6, the agent device 601 grays out the "excluded actions" and may additionally or alternatively cause these presented "excluded actions" to be inaccessible to the call agent (e.g., by removing functionality when an excluded action is selected or clicked). In some variations, the agent device 601 may forego presenting an action type, such as by not presenting an excluded action in the user interface 610 so as to prevent the call agent from using, selecting, performing or suggesting the excluded action.

Figure 7:
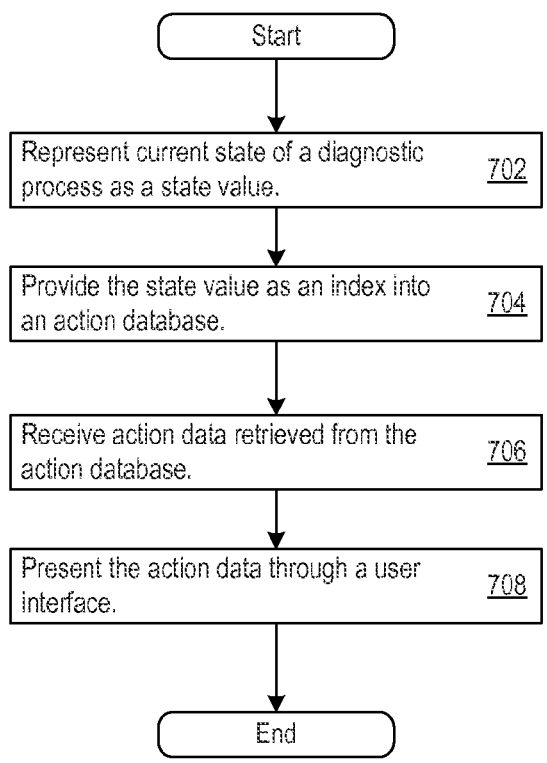
FIG. 7 shows an example of a method that the agent device may implement to present action data.

FIG. 7 shows an example of a method 700 that the agent device 601 may implement to present action data 606. The agent device 601 may implement the method 700 as logic in hardware, software, or a combination of both.

The agent device 601 may represent a current state of a diagnostic process between a call agent and a caller as a state value (702), for example in any of the ways described above including with regards to the system circuitry 110. The agent device 601 may provide the state value for indexing into the action database 126 (704). For example, the agent device 601 may send the state value or other state data to the system circuitry 110 for indexing into the action database 126. Then, the agent device 601 may receive action data 606 from the system circuitry (706). The action data 606 may include one or more actions retrieved from the action database 126 and relevant to the specific state of the diagnostic process represented by the state value. The agent device 601 may present the action data 606 through a user interface 610, e.g., to a call agent to guide the diagnostic process. Presentation of the action data 606 by the agent device 601 may include one or more visual indicators to specify action(s) that should or should not be performed for the current state of the diagnostic process.

Figure 8:
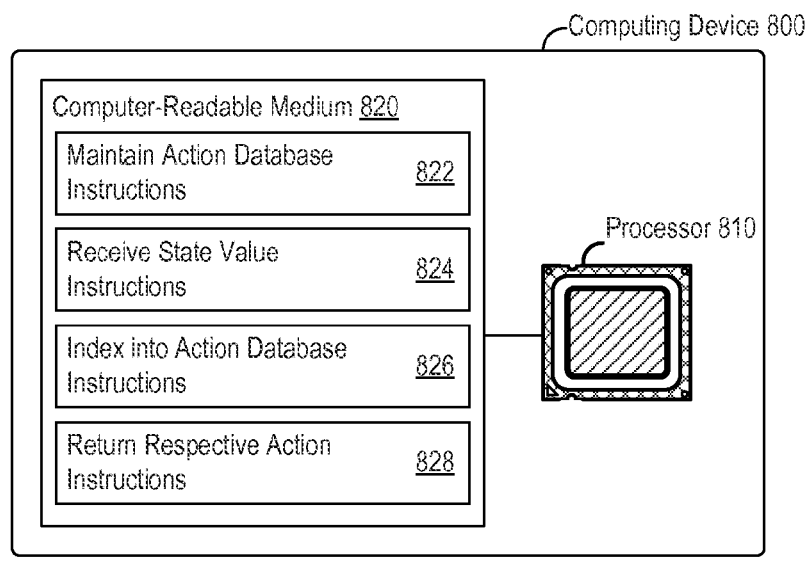
FIG. 8 shows an example of a computing device for guiding an interaction between a call agent and a caller.

FIG. 8 shows an example of a computing device 800 for guiding an interaction between a call agent and a caller. In that regard, the computing device 800 may implement any of the functionality described herein, including any functionality of the system circuitry 110, the agent device 601, or a combination of both. The computing device 800 may include a processor 810. The processor 810 may be one or more central processing units (CPUs), microprocessors, and/or any hardware device suitable for executing instructions stored on a computer-readable medium (e.g., a memory).

The computing device 800 may include a computer-readable medium 820. The computer-readable medium 820 may be any electronic, magnetic, optical, or other physical storage device that stores executable instructions, such as the instructions 822, 824, 826, and 828 shown in FIG. 8. Thus, the computer-readable medium 820 may be, for example, Random Access Memory (RAM), an Electrically-Erasable Programmable Read-Only Memory (EEPROM), a storage drive, an optical disk, and the like.

The computing device 800 may execute instructions stored on the computer-readable medium 820, for example through the processor 810. Executing the instructions may cause the computing device 800 to perform any of the state value indexing features described herein. One specific example is shown in FIG. 8 through the instructions 822, 824, 826, and 828. Executing the maintain action database instructions 822 may cause the computing device 800 to maintain an action database comprising entries storing a respective action for guiding a diagnostic process between a call agent and caller. Executing the receive state value instructions 824 may cause the computing device 800 to receive a state value indicative of a current state of the diagnostic process. Executing the index into action database instructions 826 may cause the computing device 800 to index into the action database using the state value to identify a corresponding entry for the state value. Executing the return respective action instructions 828 may cause the computing device 800 to return the respective action for the corresponding entry.

While one specific example is shown in FIG. 8, the computer-readable medium 820 may store any number of additional or alternative instructions to guide an interaction between a call agent and a caller. As another example, the computer-readable medium 820 may store instructions that cause the computing device 800 to receive an action update for a particular entry in the action database, the action update specifying an updated action for the particular entry and update the particular entry with the updated action. Instructions that cause the computing device 800 to identify the corresponding entry by determining that the state value and an index value for the corresponding entry are not identical and determining that a non-identical portion of the index value of the corresponding entry includes a masked value may be stored on the computer-readable medium 820. As yet another example, the computer-readable medium 820 may store instructions that cause the computing device 800 to maintain the action database by sequencing the entries in the action database to control which particular entry the computer identifies as the corresponding entry. While some example instructions have been presented in FIG. 8, additional or alternative instructions implementing any of the features and functionality discussed herein may be likewise stored on the computer-readable medium 820.

The systems, methods, devices, logic, and circuitry described above may provide increased flexibility and ease in guiding a diagnostic process between a call agent and a caller. By utilizing an action database 126 and indexing into the action database 126 according to a current state of the diagnostic process, the system circuitry 110 may provide a low-cost and efficient mechanism for guiding the diagnostic process and supporting changes and updates to the diagnostic process. Thus, a service provider or other entity supported by the system circuitry 110 and action database 126 may flexibly implement new or different protocols for the diagnostic process without costly system redesigns and through lesser processing, computing, bandwidth, and or human resources.

The methods, devices, systems, and logic described above, including the system circuitry 110, the action database 126, the action determination system 100, and the agent device 601, may be implemented in many different ways in many different combinations of hardware, software or both hardware and software. For example, all or parts of the system circuitry 110 or agent device 601 may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system circuitry 110 may be distributed among multiple system components, such as among multiple processors and memories, optionally including multiple distributed processing systems. For example, the system circuitry 110 may be implemented by the agent device 601, the action determination system 100, or as a combination of both. Parameters, databases, and other data structures, such as the action database 126, may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments have been described, it will be apparent to those of ordinary skill in the art that many more embodiments and implementations are possible.

Some example implementations have been described. Additional or alternative implementations are possible.

The invention claimed is:

1. A system comprising:
system circuitry comprising an action database storing an action entry, the action entry comprising a plurality of fields including:
a recommended next action for use by a call agent as a part of a diagnostic process in a recommended next action field;
an excluded action excluded from use by the call agent during the part of the diagnostic process in an excluded action field, wherein the excluded action is an action that will impede advancement of the diagnostic process for the part;
an index value associated with the recommended next action, the index value indicative of a particular state of the diagnostic process; and
wherein the system circuitry is to:
obtain a state value indicative of a current state of the diagnostic process;
index into the action database with the state value for the diagnostic process to identify the action entry by matching the state value to the index value of the action entry;
retrieve the recommended next action of the action entry for the diagnostic process; and
retrieve the excluded action of the action entry for the diagnostic process, wherein the excluded action is visually differentiated from the recommended next action for the call agent during the current state of the diagnostic process.

2. The system of claim 1, wherein the system circuitry matches the state value to the index value of the action entry when
the state value and the index value are identical.

3. The system of claim 1, wherein the system circuitry matches the current state value to the index value of the action entry when:
the state value and the index value are not identical; and
a non-identical portion of the index value includes a masked value.

4. The system of claim 1, wherein the action entry includes multiple actions; and
wherein the system circuitry provides any number of the multiple actions of the action entry for the diagnostic process.

5. The system of claim 1, wherein the action entry possible action for the current state of the diagnostic process.

6. The system of claim 1, wherein the system circuitry is further to:
receive, from a service provider, an action update for the current state of the diagnostic process; and, in response:
replace the recommended next action in the action entry with an updated action.

7. The system of claim 1, wherein the excluded action is an action that will be at least one of ineffective, inoperable, or detrimental to the particular state of the diagnostic process.

8. A method comprising:
representing a current state of a diagnostic process between a call agent and caller as a state value;
providing the state value as an index into an action database;
receiving a recommended next action and an excluded action from an action entry in the action database that is correlated to the state value, wherein the excluded action is an action that will impede advancement of the diagnostic process for the current state; and
providing the recommended next action and the excluded action for guiding the diagnostic process, wherein the excluded action is visually differentiated from the recommended next action for the call agent during the current state of the diagnostic process.

9. The method of claim 8, wherein receiving the recommended next action and the excluded action further comprises receiving a possible action for the current state of the diagnostic process.

10. The method of claim 9, further comprising:
providing both the recommended next action and the possible action for guiding the diagnostic process.

11. The method of claim 8, wherein the providing the recommended next action and the excluded action comprises providing a visual indication that the action should not be performed for the current state of the diagnostic process.

12. The system of claim 1, wherein the excluded action comprises an action that will at least one of:
compromise security of at least one of the call agent, a caller, or a call center,
reduce communication capability, or
worsen a symptom of the particular state or an issue experienced by the caller.

13. The method of claim 8, wherein the excluded action is an action that will be at least one of ineffective, inoperable, or detrimental to the current state of the diagnostic process.

14. The method of claim 8, wherein the excluded action comprises an action that will at least one of:
- compromise security of at least one of the call agent, a caller, or a call center,
- reduce communication capability, or
- worsen a symptom of the current state or an issue experienced by the caller.

15. A product comprising:
a non-transitory computer-readable medium storing computer executable instructions that, when executed by a computer, cause the computer to:
maintain an action database comprising entries storing respective actions for guiding a diagnostic process between a call agent and caller, wherein an action entry of the action entries comprises:
- a recommended next action for use by the call agent as a part of the diagnostic process in a recommended next action field; and
- an excluded action excluded from use by the call agent during the part of the diagnostic process in an excluded action field, wherein the excluded action is an action that will impede advancement of the diagnostic process for the part;

receive a state value indicative of a current state of the diagnostic process;
index into the action database using the state value to identify a corresponding entry for the state value; and
return the respective action for the corresponding entry, wherein the excluded action is visually differentiated from the recommended next action for the call agent during the current state of the diagnostic process.

16. The product of claim 15, wherein the computer executable instructions further cause the computer to:
receive an action update for a particular entry in the action database, the action update specifying an updated action for the particular entry; and
update the particular entry with the updated action.

17. The product of claim 15, wherein the computer executable instructions cause the computer to identify the corresponding entry by:
determining that the state value and an index value for the corresponding entry are not identical; and
determining that a non-identical portion of the index value of the corresponding entry includes a masked value.

18. The product of claim 15, wherein the computer executable instructions cause the computer to maintain the action database by sequencing the entries in the action database to control which particular entry the computer identifies as the corresponding entry.

19. The product of claim 15, wherein the excluded action is an action that will be at least one of ineffective, inoperable, or detrimental to the current state of the diagnostic process.

20. The product of claim 15, wherein the excluded action comprises an action that will at least one of:
- compromise security of at least one of the call agent, a caller, or a call center,
- reduce communication capability, or
- worsen a symptom of the current state or an issue experienced by the caller.

* * * * *